Dec. 11, 1956 J. F. BIGELOW 2,773,984

AUTOMATIC PHASE OR FREQUENCY CONTROL SYSTEM

Filed Dec. 18, 1950

INVENTOR
JOHN F. BIGELOW
BY R. A. Morris
ATTORNEY

United States Patent Office 2,773,984
Patented Dec. 11, 1956

2,773,984

AUTOMATIC PHASE OR FREQUENCY CONTROL SYSTEM

John Forrest Bigelow, Adams Township, Allen County, Ind., assignor to International Telephone and Telegraph Corporation, a corporation of Maryland Application December 18, 1950, Serial No. 201,350

3 Claims. (Cl. 250—36)

Figure 1:
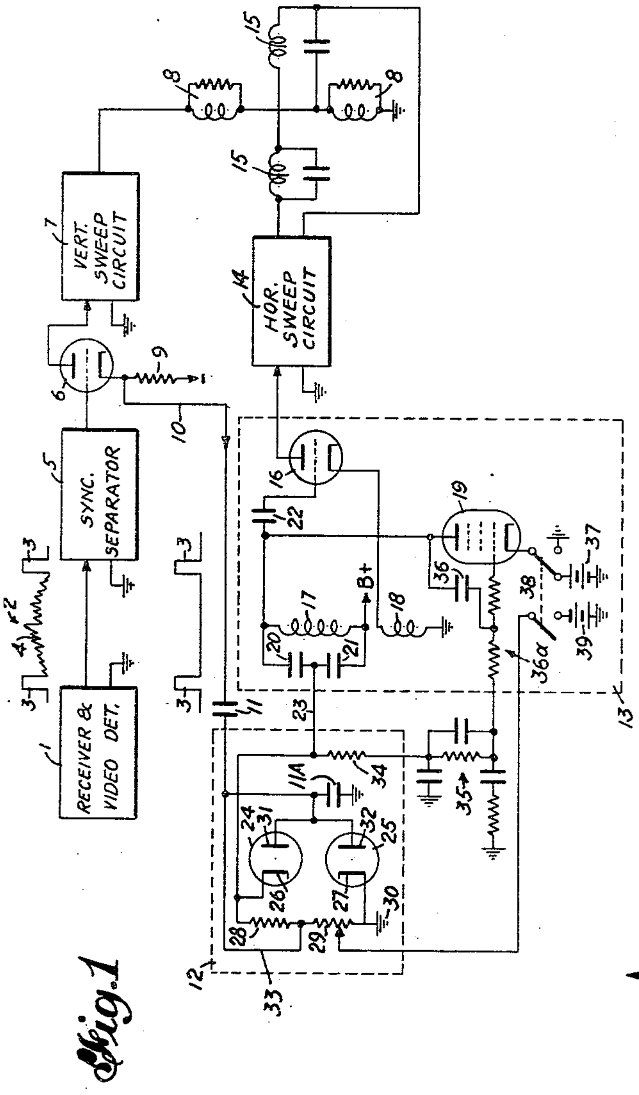

This invention relates to automatic phase or frequency control systems and more particularly to systems for automatically controlling the phase or frequency of an oscillator such as a television sweep generator, in response to synchronizing impulses.

In certain cases it is desired to maintain an oscillator in synchronism with synchronizing signals. In television receivers, for example, the line sweep generator is synchronized and held in synchronized position in response to the received horizontal synchronizing signals.

In one system which has been found to give generally satisfactory operation a sine wave oscillator controlled by a reactive timing tube circuit is used to provide oscillations from which the horizontal sweep wave is produced. To achieve the synchronizing functions a discriminator is coupled via a coil to the sine wave oscillator and the synchronizing pulses are simultaneously applied to the discriminator from the usual pulse separator. A voltage depending in sense and amplitude on the direction and degree of departure from synchronism between the wave from the oscillator and the synchronizing pulses is derived. This voltage is applied to the reactive tube to correct the tuning of the oscillator. The control grid of the reactance tube is maintained at a predetermined bias with respect to the cathode by a positive potential applied to the cathode. Such a circuit has been successfully and widely used in television receivers and will hold the oscillator in synchronism for departures of the oscillator from normal correct tuning over a fairly wide range of frequencies particularly on steady signals. An example of commercial application of this system, and an explanation of its operation, may be found in Riders Television Manual, vol. 1, for many of the television receivers.

In experimenting with this circuit after numerous tests, I have discovered that a greatly improved operation is obtained by supplying energy from the sine wave oscillator to the discriminator over a condenser coupling, and making certain changes in the discriminator to take care of the single phase application of energy as distinguished from the phase opposed relation obtained by use of the coil coupling system. Moreover, with my system further improvement in operation may be obtained by using a negative biasing potential applied to the control grid of the reactance tube instead of a positive potential on its cathode.

Without the change in bias it has been proven by actual test that the oscillator may be held in synchronism over approximately the same range of frequency deviation on steadily applied signals and twice the frequency deviation during the interrupted input signals, using my device than with the prior synchronizer. The new circuit also shows approximately a fifty percent increase in band width for pulling the oscillator into synchronism over the prior art system.

With the change in bias outlined above, the performance improvement has been found to be even greater. With this change the hold-in characteristic for interrupted signals is approximately three-to-one and the pull-in characteristic approximately two-to-one over the prior art systems. Additionally the hold-in characteristics for uninterrupted or steady signals is approximately thirty percent greater.

Accordingly, it is an object of my invention to provide a synchronizing system for an oscillator of the type in which the output of a phase or frequency discriminator supplied with energy from the oscillator and a synchronizing signal controls the tuning of the oscillator, wherein the energy from the oscillator is supplied to the discriminator over a condenser coupling circuit.

It is a further object of my invention to improve the operation of a system of the type described above, wherein a reactance tube tuning is provided for the oscillator, by supplying a negative grid biasing potential to the control grid of the reactance tube.

With these objects in view, according to a feature of my invention I provide a phase or frequency discriminator circuit the output of which is used to control a reactance device in an oscillator to be controlled, and supply to the discriminator synchronizing signals, and energy from the oscillator the latter being applied through a condenser resistor combination, the resulting discriminated output being applied to the reactance device to correct for deviations between the synchronizing pulses and the oscillator. Greater control range is had with the capacity coupling because of the elimination of a frequency-selective network, the anti-resonant circuit heretofore used to couple between oscillator and diode rectifiers.

According to another feature of my invention, a negative bias potential is applied to a control grid of a reactance tube which serves as the reactance device, together with the output voltage from the phase discriminator.

Figure 2:
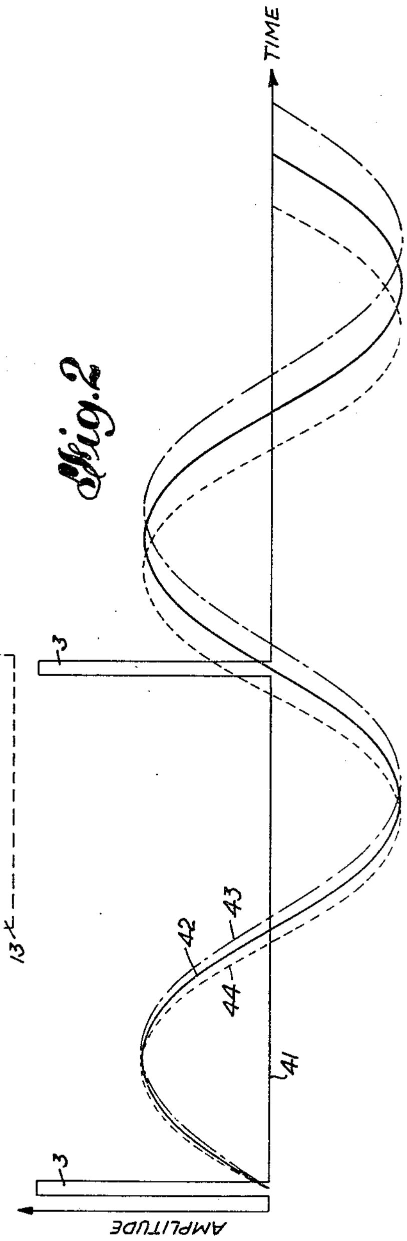

The above-mentioned and other features of this invention and the manner of attaining them will become more apparent and the invention itself will be best understood by reference to the following description of an embodiment of the invention taken in conjunction with the accompanying drawings, in which:

Figure 1 is a schematic circuit diagram of an oscillator incorporating the principles of my invention applied to a television receiver; and Figure 2 is a set of curves used in describing the operation of the circuit of Figure 1.

Turning now to Figure 1, there is shown the pertinent portions of a television receiver incorporating circuits which embody my invention. Only those parts of the circuit which are necessary to an understanding of the invention are shown in detail. The receiver and video detector are shown at 1, in the output of which appears the video wave 2 including synchronizing pulses 3 and the picture signal 4 therebetween. These pulses are applied to the synchronizing pulse separator 5 and thence to the vertical sweep circuit 7, through the anode portion of tube 6, and to the vertical deflection coils 8 of the cathode ray display tube.

The horizontal synchronizing pulses are derived from the cathode resistor 9 of tube 6 and applied over line 10 and coupling condenser 11 to phase discriminator circuit 12. For the sake of symmetry a condenser 11A may be provided as shown. This may provide a better operating characteristic for the system in some cases.

To provide the horizontal sweep for the cathode ray tube there is provided a sine wave oscillator 13 the output of which goes to circuit 14, which produces the desired sawtooth sweep wave form which in turn is applied to the horizontal sweep coils 15. Oscillator 13 includes a tube 16 having the cathode, grid and anode coupled as a Hartley oscillator in which coils 17 and 18 provide the desired feedback. A reactance coupled tube 19 is provided to control the tuning of oscillator 13. A pair of condensers 20 and 21 serve to tune the tank circuit of oscillator 13 and coupling condenser 22 isolates the anode supply energy for tube 19 from the grid of tube 16. Condensers 20 and 21 provide a voltage divider and a capacitive coupling from the output of oscillator 16 over a line 23 to the discriminator 12.

Discriminator 12 comprises a pair of rectifiers 24, 25 shown here as diode tubes. The cathodes 26 and 27 respectively of rectifiers 24 and 25 are interconnected by resistors 28 and 29 and the lower end of resistor 29 is connected to the common potential source indicated herein as ground 30. Line 23 is connected to the upper end of resistor 28. The anodes 31 and 32 of the tubes 24 and 25 are interconnected and the synchronizing pulse energy from line 10 is applied in parallel to these two anodes. A negative synchronizing signal may be used if the elements of the diodes are reversed, that is, if the two cathodes are directly connected together and the two plates connect to the extremities of resistors 28, 29. A connecting line 33 is connected to a point intermediate to the resistors 28 and 29 to complete the input circuit for these synchronizing pulses. Conductor 23 is connected by means of a resistor 34 and other condenser and resistor combination networks 35 to the control grid of tube 19 which may be a triode as well as a pentode tube. A portion of the energy from oscillator 13 is also applied over these connections and condenser 36 to the anode of tube 19 to provide the desired energy component so that a reactance effect is obtained from the tube 19. The control grid of tube 19 is maintained at a negative bias with respect to the cathode of this tube. Positive battery 37 may be connected over switch 38 to the cathode of tube 19 to supply the desired bias. Alternatively, switch 38 may be operated to connect the cathode to ground or common potential and a negative bias from battery 39 may be applied over switch 40 to the control grid. By this switching arrangement alternative operating bias may be selectively applied to the circuit. In actual design no switch would be used, one would but choose one or the other in design.

Operation of the synchronizing control circuit shown in Fig. 1 may be understood best by reference to the curves shown in Fig. 2, together with the circuit of Fig. 1. If it is assumed first that the oscillator 13 is operating in proper synchronism with the pulses 3 applied to the phase or frequency discriminator 12, then curve 41 of Fig. 2 may be regarded as the synchronizing pulse input and the solid line sine wave curve 42 may be regarded as the energy supplied by oscillator 13. A 90° (approx.) shift is caused by a reactive current thru condenser 36 and the resistor **36*a*. Thus, the grid of tube 19** is about 90° ahead of oscillator voltage.

Referring to Figure 2, the synchronizing pulse is superimposed upon a sinewave, and extends to a greater potential than does the sinewave. Since the time constant (resistance times capacity) of the discriminator circuit is long, there exists across resistor 28 and resistor 29 a direct potential which is a function of the average energy content of the current passing through resistor 28 and resistor 29, through the two respective diode sections. In view of this bias voltage, current passes through the diodes and through their associated resistors, resistor 28, resistor 29 only at the time of applied voltage peaks, that is, during the time of the synchronizing pulses.

The D.-C. voltage is a function of the peak amplitude of combined sinewave and pulse. Furthermore, the D.-C. voltage across resistor 29 is of opposite polarity to that across resistor 28 so that between their extremities, there appears a voltage which is the difference between the two.

Between plate and cathode of diode 24, the sinewave component of applied voltage is such that current would tend to flow during the negative half-cycles of sinewave voltage. Between plate and cathode of diode 25, the reverse is true; current would flow during the positive half-cycles, provided that there were no fixed bias across its load resistor.

Thus, when the synchronizing pulses coincide in time phase with the axis of the sinewave, the addition of pulse and sinewave voltages applied to each diode rectifier results in equal peak voltages and equal direct bias potential appearing across the two load resistors 28, 29. The overall voltage across their extremities is a cancellation, since the voltages are in opposition one to another. No correction voltage is applied to the reactance tube control grid, and its only bias is that provided as fixed bias.

If the frequency of the sinewave oscillator should become slightly greater than that of the synchronizing pulses, the relative position of the sinewave will be as represented by 44 of Figure 2. The peak value of sinewave plus pulse as represented in Figure 2, will become greater and the D.-C. voltage developed across resistor 29 of Figure 1 will increase. At the same time, the peak value of applied voltage across diode 24 will decrease, to the end that the voltage differential across resistors 28, 29 will be a negative voltage instead of zero as was the case of exact synchronism. This correction voltage is applied to the control grid of reactance tube 19, which causes a lesser amplification in tube 19, and a lesser reactive component to be introduced into the oscillator circuit, for correction of the sinewave oscillator frequency.

In like manner, a decrease in oscillator frequency results in a positive correction-voltage applied to the reactance tube as indicated by curve 43.

A series of comparative tests were made in circuits using the invention and prior art systems. The prior art discriminator used was that of the Capehart television chassis, known as CX–33 used in the commercial television receivers of 1950 produced by the Capehart Farnsworth Corporation. A large number of tests of this prior art receiver and of circuits embodying the invention disclosed herein showed that the new system with switches 38 and 39 connected as shown in Fig. 1 produced a considerable improvement in the band width for holding the oscillator in synchronism during interrupted signals and the pulling of the oscillator into synchronism in response to continuous steady signals while the holding in synchronism under direction of steady signals was substantially the same as in the earlier model. With the switches 38 and 39 as shown in Fig. 1 moved to the right so that a negative bias potential was applied directly to the control grid of tube 19 a marked improvement was obtained for all three of the tests. The table given below shows the results of these series of tests:

| | CX–33 | New system, pos. bias | New system, neg. bias |
|---|---|---|---|
| Hold in steady signal | 1,050~ | 990~ | 1,350~ |
| Hold in interrupted signal | 375~ | 710~ | 1,000~ |
| Pull in steady signal | 450~ | 647~ | 985~ |

In the above table, "hold in" is the frequency range over which the control signal frequency may be varied without losing synchronization of an oscillator. "Pull in" is the frequency at which transition from non-synchronous to synchronous operation occurs as the control signal frequency is varied. The numerical value of the "pull in" of an oscillator is the difference between the above frequency "pull in" and the below frequency "pull in." The hold in range with the use of an interrupted signal is, of course, less than with an uninterrupted signal since momentarily the oscillator has no control signal being applied to it.

While a particular form of oscillator and reactance control device has been illustrated, it will be clear that the principles of my invention are not dependent upon the types of oscillators or frequency control system used. Furthermore, variations in the system in accordance with my invention will readily occur to those skilled in the art.

While as shown conductor 33 is connected substantially at the midpoint of the resistor means including the two resistors 28 and 29, it will be clear that any intermediate point may be used as long as it is not necessary to have precisely a zero initial output from the discriminator means. In the system as actually provided resistors 28 and 29 were of rather high value, approximately 1 megohm, each and condensers 20 and 21 were of different values. However, the values of the condensers is unimportant since they serve presumably as a capacitive voltage divider so that the entire voltage from the oscillator need not be applied to the discriminator.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A line frequency sweep oscillator control system for television receivers, comprising a source of synchronizing pulses, a sine wave oscillator having feedback coupling coils coupled between the output and input of said oscillator, and variable reactance tube having an anode, a control grid and a cathode coupled across said coils for controlling the tuning of said oscillator, means for biasing said grid to a negative potential with respect to said cathode, a capacitive divider comprising two series condensers connected across one of said coils, a phase discriminator comprising a pair of rectifiers and a resistor between corresponding electrodes of said rectifiers, a connection between a point intermediate said condensers and one end of said resistor for applying energy from said oscillator to said discriminator, a coupling for applying pulses from said source to said discriminator across said rectifiers, whereby a voltage of magnitude and polarity dependent upon the degree and direction of departure from synchronism between energy from said oscillator and said synchronizing pulses is derived in the output of said discriminator, and means for applying energy from the output of said discriminator to said control grid to synchronize said oscillator.

2. A line frequency sweep oscillator control system for television receivers, comprising a source of synchronizing pulses, a sine wave oscillator having feedback coupling coils coupled between the output and input of said oscillator, and a variable reactance tube having an anode, a control grid and a cathode coupled across said coils for controlling the tuning of said oscillator, means for biasing said grid to a negative potential with respect to said cathode, a capacitive potential divider comprising two series condensers connected across one of said coils, a phase discriminator comprising a pair of rectifiers each having anode and cathode electrodes, a resistors interconnecting corresponding electrodes of said rectifiers, a connection between a point intermediate said condensers and one end of said resistor for applying energy from said oscillator to said discriminator, a coupling for applying pulses from said source in parallel to the other electrodes of said rectifiers of said discriminator, whereby a voltage of magnitude and polarity dependent upon the degree and direction of departure from synchronism between energy from said oscillator and said synchronizing pulses is derived in the output of said discriminator, and means for applying energy from the output of said discriminator to said control grid to synchronize said oscillator.

3. A line frequency sweep oscillator control system for television receivers, comprising a source of synchronizing pulses, a sine wave oscillator having feedback coupling coils coupled between the output and input of said oscillator, and a variable reactance tube having an anode, a control grid and a cathode coupled across said coils for controlling the tuning of said oscillator, a capacitive potential divider comprising two series condensers connected across one of said coils, a phase discriminator comprising a pair of rectifiers each having anode and cathode electrode, a resistor interconnecting corresponding electrodes of said rectifier, a connection between a point intermediate said condensers and one end of said resistor for applying energy from said oscillator to said discriminator, a coupling for applying pulses from said source in parallel to the other electrodes of said rectifiers of said discriminator, whereby a voltage of magnitude and polarity dependent upon the degree and direction of departure from synchronism between energy from said oscillator and said synchronizing pulses is derived in the output of said discriminator, and means for applying energy from the output of said discriminator to said control grid to synchronize said oscillator, and means for applying a negative bias potential to said control grid coupled between said grid and said cathode.

References Cited in the file of this patent

UNITED STATES PATENTS

| | | |
|---|---|---|
| 2,389,025 | Campbell | Nov. 13, 1945 |
| 2,496,063 | Mural | Jan. 31, 1950 |
| 2,598,370 | Gruen | May 27, 1952 |
| 2,600,288 | Zylstra | June 10, 1952 |

OTHER REFERENCES

Clark, abstract of application 618,340, published 633, O. G. 968.